(12) United States Patent
Van Den Berg

(10) Patent No.: US 8,394,274 B2
(45) Date of Patent: Mar. 12, 2013

(54) METHOD AND SYSTEM FOR TREATING DIFFERENT WASTE STREAMS

(75) Inventor: Eduardo-Alexander Van Den Berg, Amsterdam (NL)

(73) Assignee: Pharmafilter B.V., Amsterdam (NL)

( * ) Notice: Subject to any disclaimer, the term of this patent is extended or adjusted under 35 U.S.C. 154(b) by 470 days.

(21) Appl. No.: 12/677,370

(22) PCT Filed: Sep. 10, 2007

(86) PCT No.: PCT/NL2007/050445
§ 371 (c)(1),
(2), (4) Date: Mar. 10, 2010

(87) PCT Pub. No.: WO2009/035317
PCT Pub. Date: Mar. 19, 2009

(65) Prior Publication Data
US 2010/0326905 A1    Dec. 30, 2010

(51) Int. Cl.
*C02F 1/68* (2006.01)
(52) U.S. Cl. ......... 210/631; 210/749; 210/764; 210/173
(58) Field of Classification Search .................. 210/631, 210/749, 764, 173
See application file for complete search history.

(56) References Cited

U.S. PATENT DOCUMENTS

| 5,173,257 A | 12/1992 | Pearson |
| 6,351,858 B1 * | 3/2002 | Toia ................... 4/450 |

OTHER PUBLICATIONS

International Search Report dated Apr. 17, 2008, from corresponding PCT application.

* cited by examiner

*Primary Examiner* — Chester Barry
(74) *Attorney, Agent, or Firm* — Young & Thompson

(57) ABSTRACT

Method and system for treating a waste stream. The waste is presented in containers, such as chamber pots and other containers for liquid and other kinds of waste. such waste can be supplied at different locations and is immediately comminuted. In a separating stage, the waste stream is separated into container material and actual waste. Actual waste is fed to a bioreactor where the water is purified so that it may be re-used, if desired. If biodegradable, the container material may be subjected to a fermentation step. Heat and gases released in the process may be used for heating the fermenter and/or generating power. It is also possible to feed kitchen waste, which may optionally have been comminuted, to the fermentation. The stream leaving the fermentation may be separated into hard components which are filtered off and composted and into softer components which can be fed to the purification installation.

22 Claims, 2 Drawing Sheets

METHOD AND SYSTEM FOR TREATING DIFFERENT WASTE STREAMS

BACKGROUND OF THE INVENTION

1. Field of the Invention

The present invention relates to a method for treating a number of different waste streams in a care institution, such as a hospital, home for the elderly, nursing home and the like. The invention also relates to a system for treating a number of different waste streams in a care institution.

2. Description of the Related Art

Such waste streams may comprise many different kinds of materials. The most elementary are urine and feces which are collected in chamber pots and urinals. It is customary to deposit the urine and feces in a toilet bowl and dispose of them via the public sewage system, following which these will be discharged to the surface water, optionally after purification treatment in a purification installation for public sewage water (RWZI). This has the drawback that the chamber pots and urinals have to be cleaned separately, which is expensive and labor-intensive and, in addition, increases the risk of contamination. A second drawback is the fact that any medicinal and/or toxic substances contained in the urine and/or feces may end up in the surface water.

In order to overcome the first drawback, American document U.S. Pat. No. 6,351,858 B1 discloses a process to collect feces and urine in containers and to gather these containers together with their content. The containers are placed on a trolley and taken to a comminuting machine. The comminuting machine then comminutes the containers (together with their contents) with the addition of a homogenizing liquid, such as water. The combination is discharged to the public sewage system, optionally after having been filtered. Although the known process may have a positive effect on hygiene in the care institution, the abovementioned second drawback of the possible release of medicinal and/or toxic substances into the environment is not overcome. In addition, the known process still requires the containers to be collected and the collected containers to be physically moved by means of a transport vehicle to a comminuting apparatus which is located inside the building of the care institution.

However, there are more waste streams which have to be treated in a care institution. A further waste stream is formed by kitchen waste. This kitchen waste is generally not contaminated, that is to say does not contain medicinal and/or toxic substances which are harmful to the environment, and can be taken to a dump in garbage bags or to an industrial composting plant in containers for vegetable, fruit and garden waste. Collecting kitchen waste, putting it into garbage bags or into containers for vegetable, fruit and garden waste and transporting the garbage bags to a dump or industrial composting plant using trucks is expensive and labor-intensive.

A further waste stream consists of waste water which originates from departments in the care institution which use water, for example bath and/or shower water or water used in a kitchen, which is normally discharged via the sewage system. However, such bath and/or shower water is often polluted with medicinal and/or toxic substances, which, for example, originate from patients' perspiration moisture. The sewage water which is contaminated in this way can then pass into the environment without having been purified or at least not sufficiently purified.

A further waste stream is formed by waste which is caused by the treatment of patients, such as drugs, bandages, etcetera. Such waste is potentially contaminated, that is to say that the waste contains a relatively high concentration of medicinal, bacterially and virally infectious material and/or toxic substances, and discharging such waste untreated has grave consequences. In the first place, the environment where the waste is dumped suffers badly. If such waste reaches a sewage water purification installation (RWZI), additional measures have to be taken in order to remove this waste. This would mean that the entire volume of waste, also the less polluting components thereof have to be treated, which results in high costs. Therefore, in practice, this waste is not discharged via the sewer system, but is discharged strictly separate from the other waste. Currently, specific hospital waste (SHW), also referred to by Eural code 18 of the European list of waste substances, has to be presented in special containers and disposed of in special incinerators suitable for incinerating hospital waste.

As has been explained above, the care institution produces different waste streams. Some waste streams are discharged via the usual sewage system and other waste streams are collected separately and discharged via separate procedures.

BRIEF SUMMARY OF THE INVENTION

It is an object of the present invention to make the treatment of waste streams more efficient, as a result of which the costs for care institutions can be reduced without compromising hygiene.

It is another object of the present invention to make the treatment of waste streams more hygienic.

Furthermore, it is an object to purify the quality of the waste water from polluted, toxic, medicinal, bacterial, viral and/or hormonal substances as well as the other substances which are also purified by a sewage water purification installation in such a manner that the quality of the waste water is significantly improved and, if desired, is also of sufficient quality for the purified water to be discharged into the surface water.

At least one of these objects is achieved by the method for treating a number of different waste streams by means of a local purification system of a care institution, wherein the waste streams comprise at least one first waste stream which comprises substantially feces and urine and a second waste stream which comprises substantially waste placed in a container and comprising medicinal and/or toxic substances, the method comprising:

discharging the first waste stream and the second waste stream via pipes of a pipe system, the waste streams being fed to respective pipes of the pipe system at different locations, passing the waste streams through one or more comminuting devices for comminuting the waste and the containers, separating the actual waste and the container material from the waste stream which is obtained in this manner, feeding the actual waste to a purification installation and purifying the liquid constituents present therein.

The purification system is local which means that it is provided in or near the care institution, and may, in addition, be readily connected to the public sewage system or to the surface water. The latter is possible by virtue of the extremely low degree of pollution of the discharge stream produced by certain embodiments of the purification system according to the invention.

The inventors have come to the surprising finding that it is readily possible to jointly treat and purify two or more waste streams which should normally be kept strictly separate in care institutions. Once the inventors had arrived at this finding, it became clear that the joint treatment of the waste streams has a large number of advantages. As, for example, the first and second waste streams are passed through at least one purification device which is the same for both waste streams and, in some embodiments, waste streams can also be passed through the same comminuting devices, the costs for purifying the waste streams can be dramatically reduced.

The different waste streams can be introduced into the pipe system separately in order to be mixed with one another in it in a further step. It is, for example, possible to carry out mixing directly at the inlet into the system, so that the comminuting treatment is carried out on the mixture of waste streams. In another embodiment, the waste streams are first comminuted separately, for example by passing the waste streams one after the other through the same comminuting device or by passing each of the waste streams through a separate comminuting device, in order only then to be mixed with one another. The subsequent separating stage is then carried out on the mixture of the different waste streams. Depending on the type of waste stream, it is also possible to omit the comminuting step. When processing shower and/or bath water, for example, the comminuting step can be omitted.

In addition, according to the present invention, the container and the actual waste are no longer separated. That is to say, feces and/or urine are discharged together with the container (such as a chamber pot), which means that the costly handling of containers is made completely redundant. The containers are made to be disposable. According to the present invention, it is possible to feed waste to a pipe system at different locations, for example in each department.

As a first step, the first and second waste stream are comminuted directly at the inlet, so that the waste can be introduced into a pipe system without any risks so that there is no fear of blockage.

Subsequently, the waste from different inlets is subjected to a separating treatment, preferably at a central location. During this separating treatment, the container material is separated from the actual waste stream. The actual waste stream comprising urine, feces, drugs and the like is fed to a purification installation and, after having been processed, purified water is obtained which may, if desired, be re-used, but can at least be discharged to the sewer system without causing environmental damage. The purification installation may comprise a bio-membrane reactor, that is to say a reactor in which the liquid which is released is subjected to membrane filtration in order to guarantee purity. Any sludge which may have accumulated can be discharged periodically. However, the amount of sludge is very small and does not cause substantial costs. Other purification techniques may also be used in addition to or instead of purification by means of a bio-membrane reactor, which may, for example be based on filtration. It is also possible to use a succession of several filter systems.

If the container material used substantially consists of plastic material, the latter is cleaned following the comminuting and separating treatment and can be discharged in order to be re-used. The flushing water which results from this process may be fed to the purification installation.

If the container material contains biodegradable substances, such as substances based on PLA, purification is preferably likewise carried out after separation from the actual waste. In this case as well, flushing water can be fed to the bioreactor. The resulting relatively clean PLA can be subjected to a fermentation treatment in a fermenter. It is also possible to feed in waste streams from, for example, the kitchen of a hospital or the like. Such waste streams will likewise preferably be comminuted beforehand.

During fermentation, both solid/liquid material and gas are released. This gas can be used for heating purposes, for example for heating the fermenter and/or for generating power. The solid/liquid material is preferably separated into hard components and non-hard components. The hard components can be composted, while the non-hard components can be fed to the inlet of the purification installation. Using the present invention, it is possible to process a stream of waste in a continuous manner, while the resulting substances can generally be effectively re-used so that the processing of the latter does not entail high costs. Preferably, bio-membrane filtration, in particular ultrafiltration, nanofiltration, osmosis and/or hyperfiltration takes place in the purification installation, followed by additional filtration techniques, such as oxidation, UV-filtration, active carbon filtration and the like. The purpose of this additional filtration is to remove substances, such as for example heavy metals and/or toxic substances, which have not been filtered out by the membrane filters.

The invention also relates to a purification system of a care institution for treating a number of different waste streams, wherein the waste streams comprise at least one first waste stream which substantially comprises feces and urine and a second waste stream which comprises waste substantially placed in a container and comprising medicinal and/or toxic substances, the purification system comprising a pipe system with a number of inlets which can be arranged at different locations in the care institution and which are connected to the outlets for at least the first and second discharge stream, one or more comminuting devices connected to each of the inlets via pipes for comminuting the waste together with the containers from the discharge flows, wherein the outlets of the comminuting devices are connected to a separating device for separating actual waste materials and container materials from the waste stream, a purification installation being connected to the outlet of the separating device for the actual waste material.

BRIEF DESCRIPTION OF THE DRAWINGS

The invention will be explained below in more detail by means of two exemplary embodiments, in which.

DETAILED DESCRIPTION OF THE PREFERRED EMBODIMENTS

Figure 1:
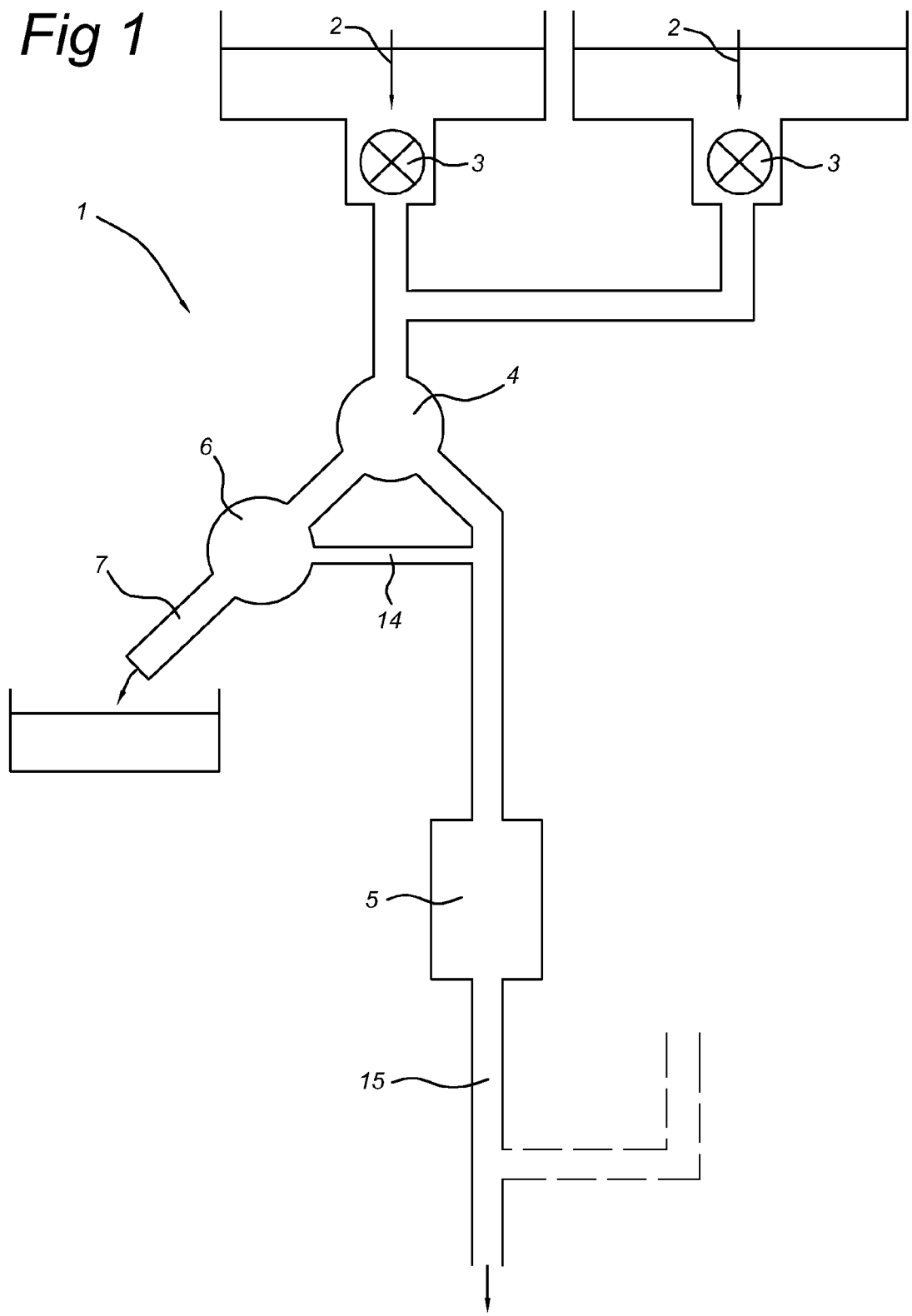
FIG. 1 diagrammatically shows a first variant of the invention for use with non-biodegradable containers.

In FIG. 1, reference numeral 1 denotes a first variant of the system according to the present invention. Such a system is preferably used in a care institution or another establishment where intensive care of people takes place used, such as a hospital, home for the elderly and the like.

Waste is produced during caring, such as feces and the like, and this is discharged together with the container thereof via inlets 2 located in the various departments. A pipe system is connected to the inlets through which the waste can be transported. The term "pipe" is in this context understood to mean any form of tube, shaft, duct, conduit, etc. A comminuting device 3 is situated directly downstream of the inlets 2. After comminution, the waste can readily be passed through a pipe system. Preferably, a central separating device 4 is provided into which the different inlets debouch. In this separating device, the actual waste (feces and the like) is separated from the containers, that is to say the container material. The actual waste is fed to a purification installation 5. The liquid material (water) which constitutes by far the largest part is discharged at 15 following a further separation and may be re-used, if desired. Incidentally, discharge to a sewer system does not cause any environmental damage so that no additional environmental levies will have to be paid.

The stream of container material is passed to a purification device 6. The plastic material or other material is treated by means of a cleaning fluid, for example flushing water which may, for example, be the flushing water emanating from outlet 15. Subsequently, the flushing water is separated from the treated material and this flushing water is returned to the purification installation 5 via pipe 14. The treated container material is discharged via outlet 7 in order to be re-used.

In contrast to the prior art, the above method does not result in large amounts of polluted waste which is very expensive to process.

Figure 2:
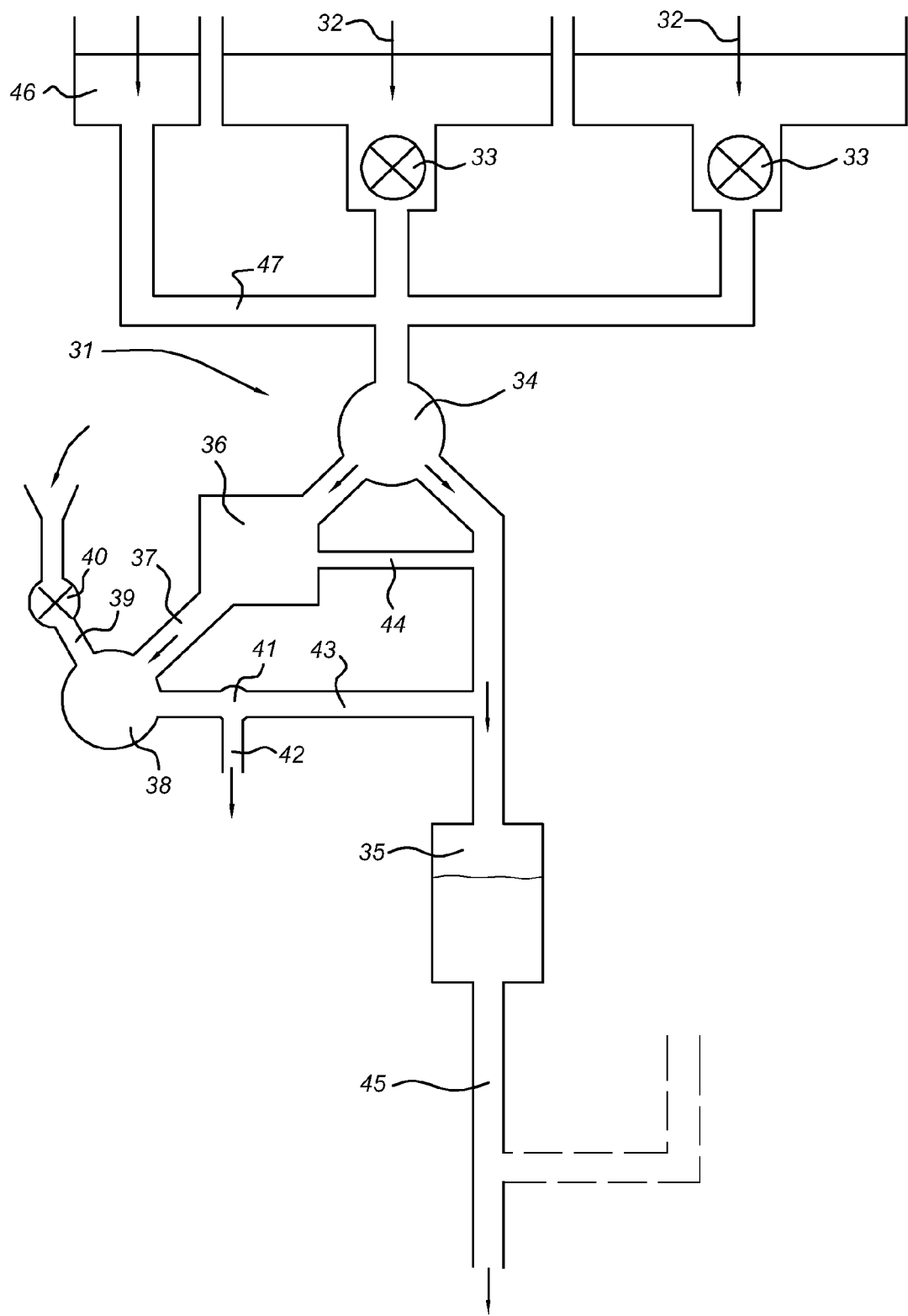
FIG. 2 shows a variant of the invention for use with biodegradable containers.

FIG. 2 shows a variant of the present invention. In this case, the system is denoted overall by reference numeral 31 and waste is supplied via inlets 32. In contrast with the embodiment from FIG. 1, the container portion of the waste comprises biodegradable types of material, such as paper-like types of material, biodegradable plastics, such as PLA plastics. These are comminuted in a comminuting device 33 in the manner described above and centrally fed to a separating device 34 where the actual waste stream is again separated from the container material. The actual waste stream is fed to the purification installation 35 and the water which is released in the process is discharged via outlet 45 in order to be re-used.

The biodegradable material which is released in the separating device 34 is initially treated in the manner described above in purification device 36. The flushing water which is used and which may come from outlet 45 is again fed to the purification installation 35 in this case as well. The treated container material is fed to a fermenter 38 by means of a pipe 37. It is also possible to feed kitchen waste to this fermenter 38 by means of inlet 39 and a further comminuting device 40.

Fermentation in the fermenter 38 produces heat/gas, which heat/gas can be used for heating the fermenter 38 and/or for generating power in order to promote the degradation process and the conditions for the micro-organisms in the fermenter. The solid/liquid waste stream is fed to a separator 41 where the hard components are filtered out and discharged in order to be composted 42. If desired, a heating step is also carried out in order to render any bacteria in the hard components harmless by heating. The softer components including the liquid are fed to the purification installation via pipe 43.

The above variants show that many variants are possible based on the inventive idea. It is possible to add stages and/or to skip stages. All this is covered by the scope of the attached claims and rights are expressly requested for the subject matter of the subclaims, separate from the main claim.

Above, reference has been made to a waste stream obtained by comminuting a container which contains waste. However, the device described is not limited to treating only this type of waste stream. It is also possible to carry water originating from showers, toilets, kitchens, denoted in FIG. 2 by reference numeral 47, along in the waste stream to be treated. Such a device is connected to the pipe system by means of the pipe 46.

Actually, all the water which is used in a care institution and which has, until now, been discharged in the sewage system, can be treated in this manner. One of the examples which has already been mentioned is shower water. When a patient, whose body perspiration may contain medicinal or hormonal waste substances, or other harmful waste substances (such as chemotoxic agents), is being showered or showers, such substances end up in the shower water. These substances can then likewise be removed in the purification installation according to the invention.

The present invention is not limited to the preferred embodiments described above. The scope of protection is determined by the scope of the following claims which allows for a great many modifications.

The invention claimed is:

1. A method for treating a number of different waste streams by a local purification system of a care institution, the different waste streams comprising at least one first waste stream which comprises substantially feces and urine and a second waste stream which comprises substantially waste placed in a container and comprising medicinal and/or toxic substances, the method comprising:
   discharging the first waste stream and the second waste stream via pipes of a pipe system, the waste streams being fed to respective pipes of the pipe system at different locations;
   passing the first and second waste streams through one or more comminuting devices for comminuting the waste and the containers;
   separating the actual comminuted waste and the comminuted container material from a combined waste stream from the first and second waste streams having passed through the one or more comminuting devices; and
   feeding the actual comminuted waste to a purification installation and purifying the liquid constituents present therein.

2. The method as claimed in claim 1, comprising treating the separated container material with a cleaning fluid, discharging the cleaning fluid to the purification installation and discharging the separated and treated container material.

3. The method as claimed in claim 2, comprising fermenting the discharged and treated container material in a fermenter.

4. The method as claimed in claim 1, wherein the different waste streams als further comprise a third waste stream substantially comprising shower and/or bath water.

5. The method as claimed in claim 1, wherein the different waste streams further comprise a fourth waste stream substantially comprising food.

6. The method as claimed in claim 1, wherein the different waste streams are fed into the pipe system separately and mixed with one another after being fed into the pipe system.

7. The method as claimed in claim 6, comprising first comminuting the first and second waste streams and then mixing the comminuted first and second waste streams.

8. The method as claimed in claim 7, comprising mixing the comminuted first and second waste streams with a non-comminuted further waste stream following comminution of the first and second waste streams.

9. The method as claimed in claim 1, wherein said container comprises a biodegradable material and is fed to the purification installation.

10. The method as claimed in claim 9, wherein the biodegradable material of said container is fermented prior to being fed to a purification installation.

11. The method as claimed in claim 10, also comprising the fermentation of the fourth waste stream.

12. The method as claimed in claim 3, wherein heat produced during fermentation is used for heating the combined waste stream in the fermentation tank and/or the use of generating power.

13. The method as claimed in claim 3, wherein hard components are removed from the combined waste stream produced during fermentation which is fed to the purification installation.

14. The method as claimed in claim 1, wherein the material of non-biodegradable substances in the actual comminuted waste is separated from the material of biodegradable substances after comminution, and wherein the biodegradable substances are discharged separately from said a bioreactor/fermentation system.

15. The method as claimed in claim 1, wherein purifying the liquid constituents of said combined waste stream comprises membrane filtration.

16. A purification system (1, 31) of a care institution for treating a number of different waste streams, wherein the waste streams comprise at least one first waste stream which comprises substantially feces and urine and a second waste stream which comprises substantially waste placed in a container and comprising medicinal and/or toxic substances, the purification system comprising:
a pipe system with a number of inlets (2, 32) which can be arranged at different locations in the care institution and which are connected to the outlets for at least the first and second discharge stream, one or more comminuting devices (3, 33) connected to each of the inlets via pipes for comminuting the waste together with the containers from the discharge flows, wherein the outlets of the comminuting devices are connected to a separating device (4, 34) for separating actual waste materials and container materials from the waste stream, a purification installation (5, 35) being connected to the outlet of the separating device (4, 34) for the actual waste material.

17. The purification system as claimed in claim 16, wherein the separating device comprises a further outlet for discharging the container materials, which outlet is connected to a purification device for treating the separated container material with a cleaning fluid.

18. The purification system as claimed in claim 17, wherein the purification device is provided with a first discharge for discharging the waste cleaning fluid to the purification installation and a second discharge for discharging the separated and treated container material.

19. The purification system as claimed in claim 16, wherein a fermenter (38) is connected to the second outlet of the separating device for the container materials.

20. The purification system as claimed in claim 19, wherein the fermenter comprises an inlet for a fourth waste stream substantially comprising food.

21. The purification system as claimed in claim 16, wherein the pipe system comprises at least one further inlet (47) which is connected to a water-consuming device (46), in particular a shower and/or toilet and/or kitchen, for discharging a third waste stream.

22. The purification system as claimed in claim 16, wherein a liquid separator (41) having a first outlet for discharging separated liquid and a second outlet for discharging the remainder of the waste, is arranged in or downstream of the fermenter, and wherein the first outlet is connected to the purification installation (35).

* * * * *